United States Patent [19]

Duchateau

[11] Patent Number: 4,516,651
[45] Date of Patent: May 14, 1985

[54] VEHICLES TRAVELLING ON AIR CUSHIONS ALLOWING MOVEMENT OF THE LATTER OVER ALL TYPES OF TERRAIN

[75] Inventor: Claude M. Duchateau, Rueil Malmaison, France

[73] Assignee: Societe d'Etudes et de Developpement des Aeroglisseurs Marins, Terrestres et Amphibies S.E.D.A.M., Paris, France

[21] Appl. No.: 451,256

[22] Filed: Dec. 20, 1982

[30] Foreign Application Priority Data

Dec. 23, 1981 [FR] France .............................. 81 24134

[51] Int. Cl.³ .............................................. B60V 1/16
[52] U.S. Cl. .................................................. 180/127
[58] Field of Search ............... 180/127, 128, 129, 130, 180/123; 114/67 R

[56] References Cited

U.S. PATENT DOCUMENTS

| | | | |
|---|---|---|---|
| 3,384,197 | 5/1968 | Bingham et al. | 180/128 X |
| 3,420,330 | 1/1969 | Bliss | 180/123 X |
| 3,680,657 | 8/1972 | Marchetti et al. | 180/127 X |
| 3,756,343 | 9/1973 | Joyce | 180/127 |

FOREIGN PATENT DOCUMENTS

| | | | |
|---|---|---|---|
| 1599638 | 8/1970 | France . | |
| 2301422 | 9/1976 | France | 180/127 |
| 1109562 | 4/1969 | United Kingdom . | |
| 1287487 | 8/1972 | United Kingdom . | |
| 1315176 | 4/1973 | United Kingdom . | |

Primary Examiner—John A. Pekar
Attorney, Agent, or Firm—Fleit, Jacobson, Cohn & Price

[57] ABSTRACT

A vehicle travelling on air cushions comprises a lifted structure and a lift arrangement which comprises at least one multilobular skirt having a plurality of first lobes open towards the inside of the vehicle. A lower part of each first lobe converges in a downwards direction with respect to the structure. At least in the vicinity of the rear of the vehicle, each open first lobe has within it an anti-damage lobe which diverges in a downwards direction with respect to the structure at an inclination such that the values of the angles formed between the respective outermost generatrices of the first and anti-damage lobes with respect to the vertical are substantially equal. The side edges of the anti-damage lobe are each connected along a rectilinear connection to the opposite side walls of the first lobe which converge in a downwards direction with respect to the structure. The anti-damage lobe is also at its lower part, and in a horizontal plane, connected to the base of the first lobe. Since the slope of the anti-damage lobe is of opposite inclination to that of the first lobe, the lower part of the anti-damage lobe trails rather than leads when at the vehicle's rear. So the anti-damage lobe slips more easily over projections from rough terrain and lifts the skirt. An access or gap admits pressurized air into the volume between the first and anti-damage lobes. From this volume lower openings may lead to discharge water from the volume.

12 Claims, 6 Drawing Figures

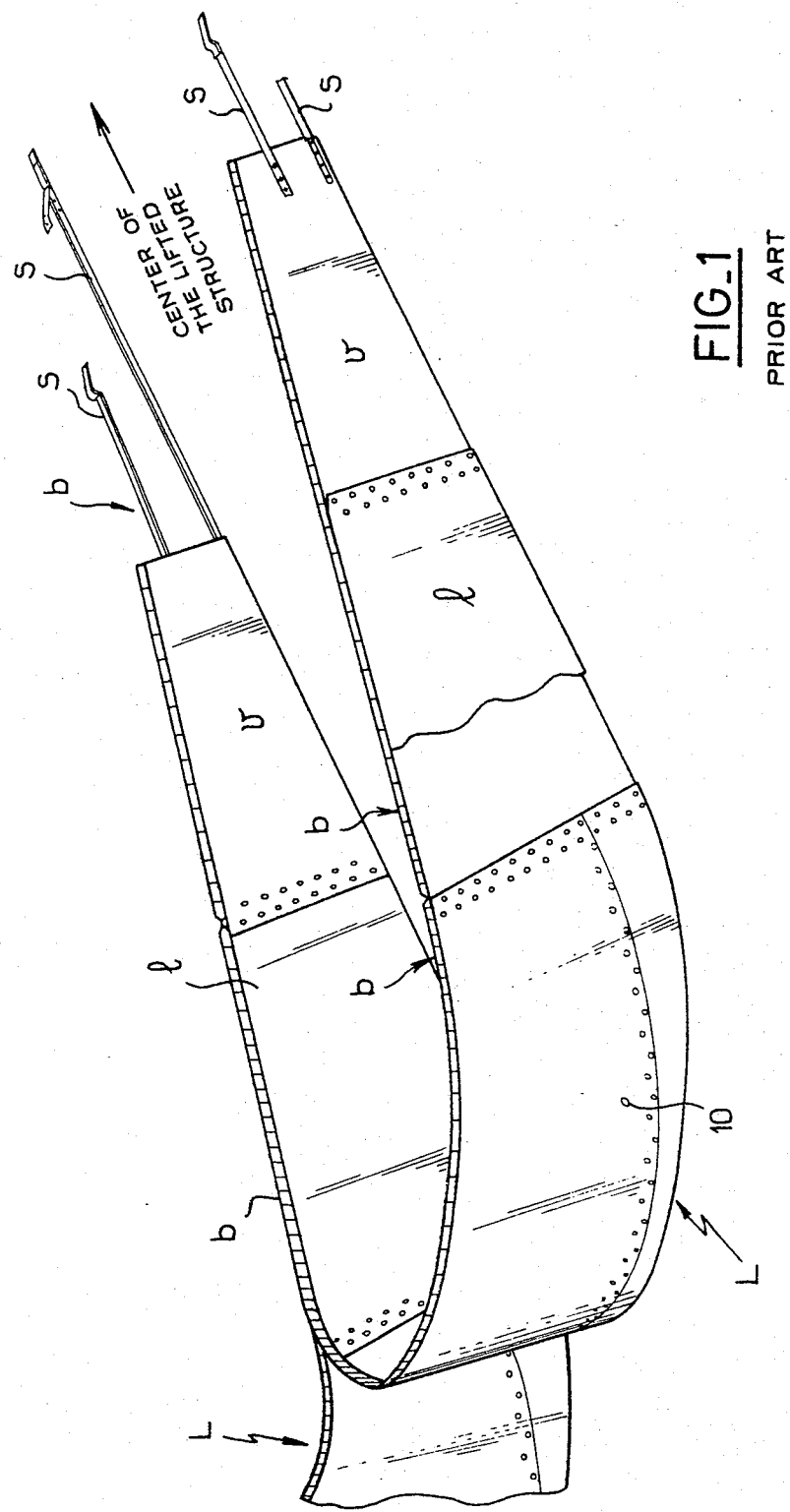
FIG_1
PRIOR ART

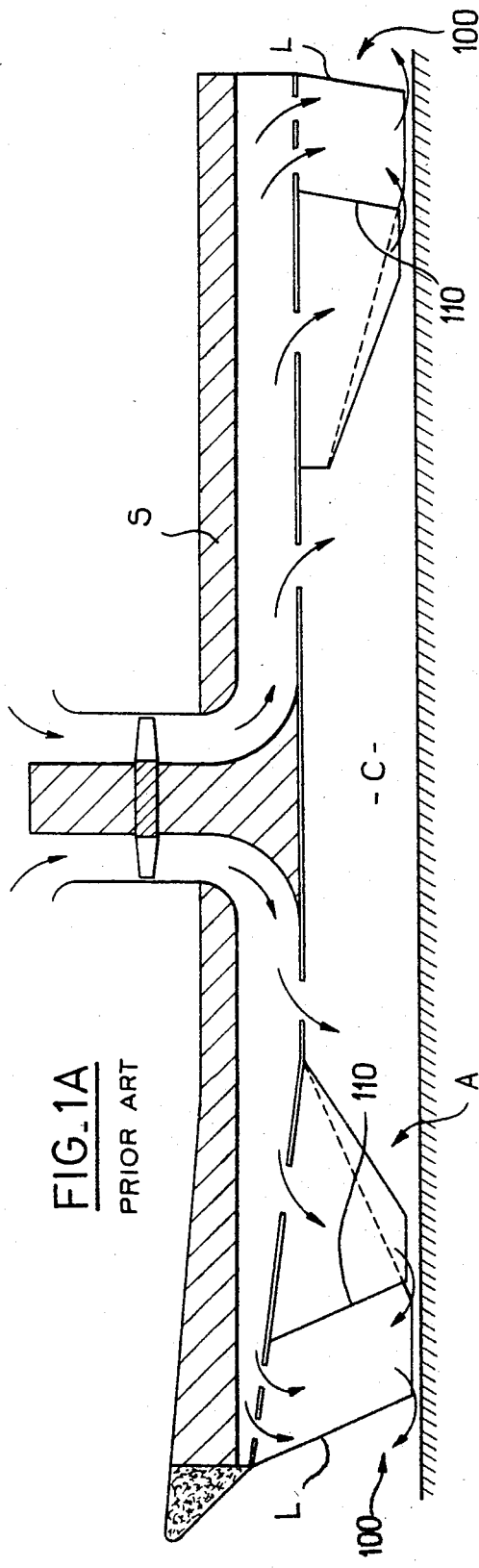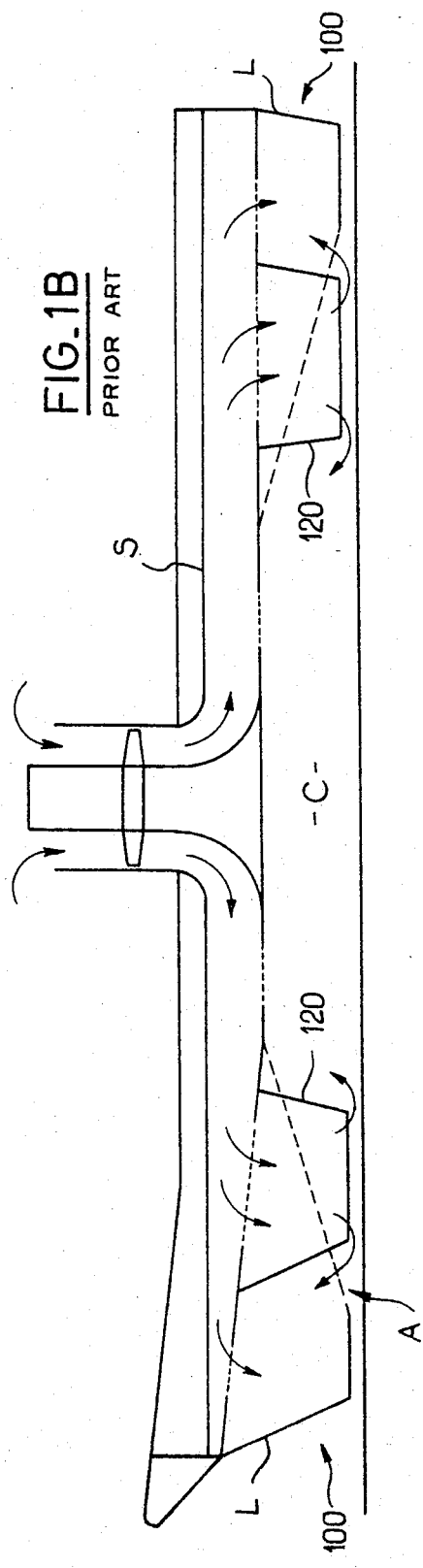

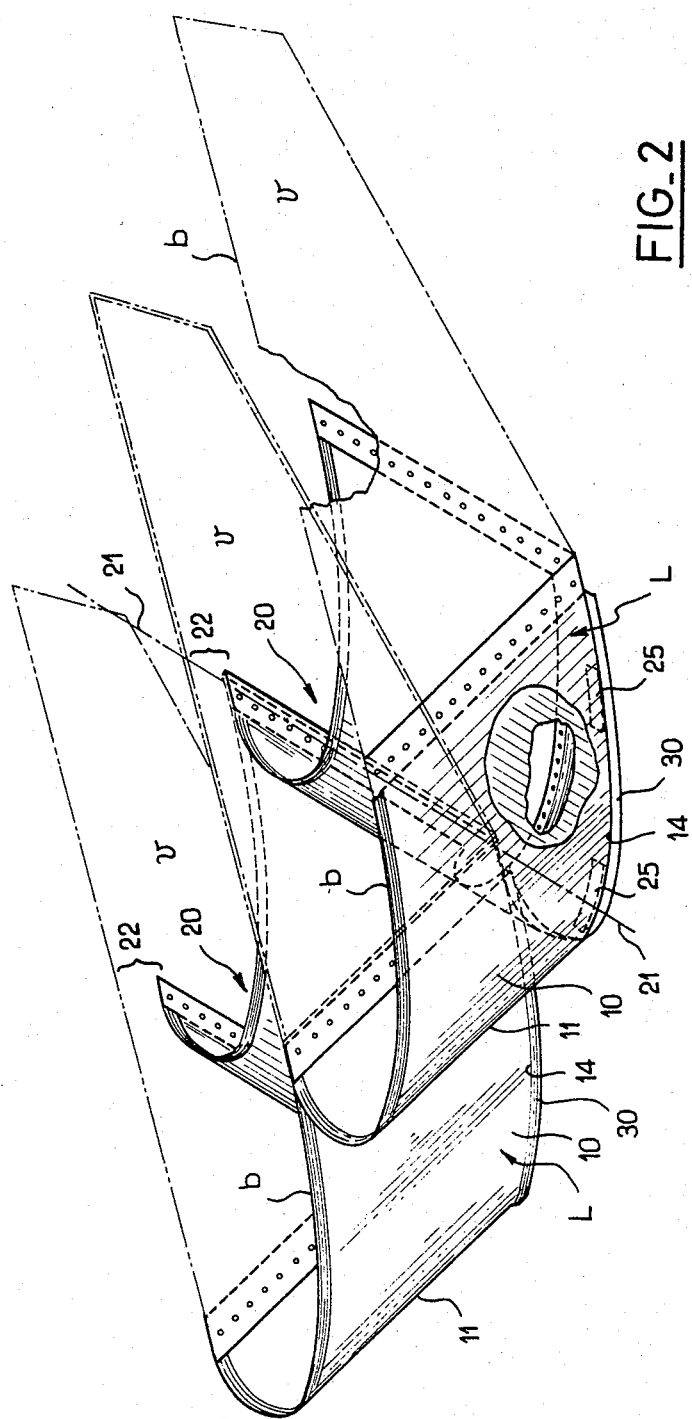
FIG_2

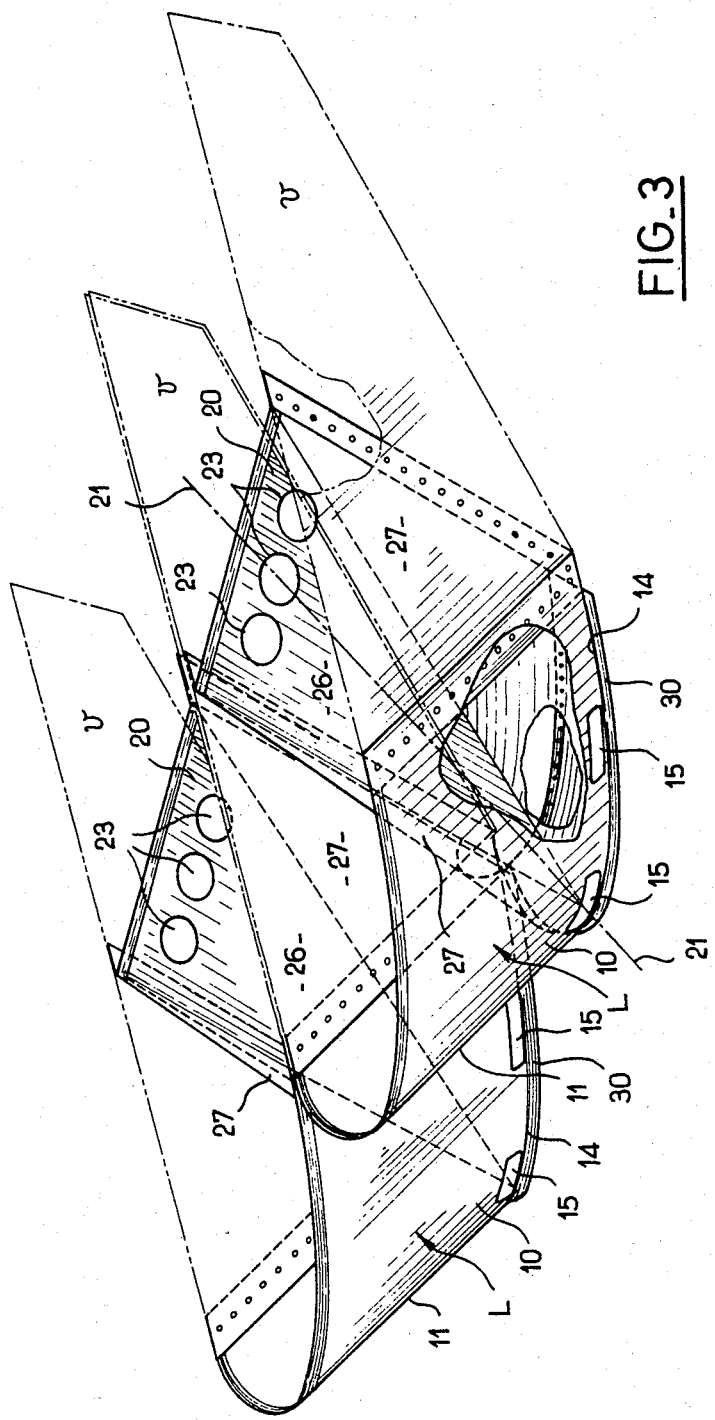
FIG_3

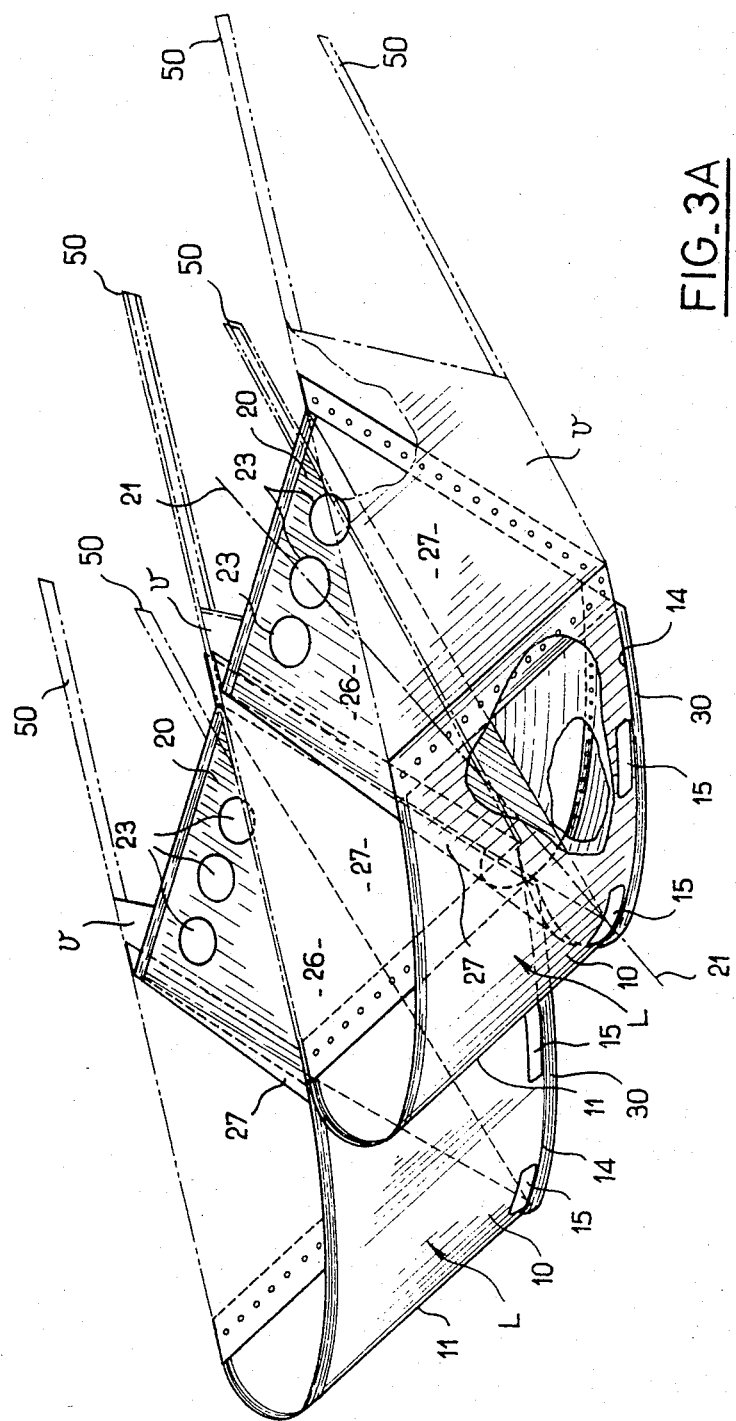
FIG._3A

VEHICLES TRAVELLING ON AIR CUSHIONS ALLOWING MOVEMENT OF THE LATTER OVER ALL TYPES OF TERRAIN

This invention relates to vehicles or machines travelling on cushions of pressurized fluid, so called ground-effect machines.

Hereafter, in order to simplify the explanation, reference will be made solely to vehicles travelling on air cushions, without this expression being limiting.

The vehicles travelling on air cushions may be of the type described in one or other of the two French Pat. Nos. 74 27 139 (publication No. 2 181 251) filed on Aug. 5, 1974 and 75 04960 (publication No. 2 301 422) filed on Feb. 18, 1975 as well as in French patent application No. 79 23213 (publication No. 2 465 624) filed on Sept. 18, 1979.

These patents and the aforementioned French application are mentioned here purely for reference.

More precisely, the present invention relates to vehicles travelling on air cushions, as shown in FIGS. 1A and 1B which correspond, respectively, to FIG. 1 of French Pat. No. 7,427,139, and FIG. 2 of French Pat. No. 7,504,960, of the type comprising a lifted structures and a lift arrangement A which comprises at least one skirt 100 constituted by a plurality of adjacent lobes L, which are open towards the inside of the vehicle and the lower part of which converges in a downwards direction with respect to the structure. In particular, vehicles travelling on air cushions are known in which the lift of a structure in ensured by a plurality of air cushions defined by flexible skirts, preferably of rubberized fabric, which define a central lift cushion and a peripheral lift arrangement.

As described in French Pat. No. 74 27139 (2 181 251), and shown in FIG. 1A the central cushion C is generally defined by an inner skirt 110 constituted by a plurality of inner lobes which are adjacent and tangential with respect to each other, which are open in the direction of the centre of the central cushion (which coincide substantially with the centre of the lifted structure) and which converge in a downwards direction with respect to the centre of the structure.

In one version, the central cushion is defined not by a plurality of inner lobes, which are open and adjacent, but by a ring of closed skirts 120, adjacent one with respect to the other and interposed between the central lift cushion and the peripheral arrangement. In order to understand this version correctly, it is useful to refer to French Pat. No. 75 04960 (2 301 422), or to FIG. 1B.

The peripheral arrangement provided around the central cushion C which has been described is defined externally by a plurality of outer adjacent lobes L, open towards the inside of the vehicle, each lobe of the outer skirt comprises at least one lower part which converges in a downwards direction with respect to the structure. The adjacent outer lobes which are open towards the inside of the vehicle, thus define in combination with the central lift cushion, a plurality of adjacent closed cells (or compartments) which strictly speaking constitute the peripheral arrangement.

Hereafter, in order to simplify the explanation, an "outer multilobular skirt" will refer to an outer skirt of this type constituted by an arrangement of outer lobes, which are open and adjacent, which converge in a downwards direction with respect to the structure and an "inner multilobular skirt" will refer to an inner skirt constituted by an arrangement of inner lobes, which are open and adjacent, which converge in a downwards direction with respect to the structure and which define the central cushion.

In a version described with regard to FIG. 11 of French Pat. No. 74 27139 and which relates in particular to the case where the central cushion is defined by an inner multilobular skirt, it is possible to add to at least certain of the closed, adjacent compartments or cells, an auxiliary closed skirt, which is preferably frustoconical and which becomes narrower in a downwards direction. The purpose of auxiliary skirts of this type is to improve the stability of the vehicle.

FIG. 1 of the accompanying drawings illustrates a lobe of a multilobular skirt of a vehicle travelling on air cushions. Each lobe L is constituted, as shown, by a wall 10, of rubberized fabric and of arcuate shape, which converges in a downwards direction with respect to the structure. The sides 1 of the lobe are kept under tension by side panel members v connected to straps S or similar members. The upper edge b of the skirts is connected in a sealed manner to the platform of the lifted structure (not shown).

The lobe L shown in FIG. 1 may belong either to an outer multilobular skirt defining externally a peripheral lift arrangement, or to an inner multilobular skirt which defines a central lift cushion.

In the case of an outer multilobular skirt, each lobe may nevertheless be constituted (as described in French patent application No. 79 23213) by the assembly of an upper part (not shown in FIG. 1 of the drawings accompanying this present application) which diverges in a downwards direction with respect to the structure and of a lower part which converges in a downwards direction with respect to the latter, so that the arrangement of the lobe projects outside the structure. Naturally, in such a case, the edge of the upper part is connected in a sealed manner to the lifted structure.

Furthermore, as has already been mentioned, in a conventional manner, each lobe L may enclose laterally a skirt which is closed or otherwise (not shown), which is preferably cylindrical or frustoconical, thus being bilaterally tangential to the latter, in an area which is sufficient to ensure the seal.

In order to achieve a better understanding of all the variations which are compatible with the present invention, reference may advantageously be made to the above mentioned patents and patent application.

However it has been found that the multilobular skirt constituted by a plurality of lobes which are open towards the inside of a vehicle and whereof the lower part converges in a downwards direction with respect to the structure, whether this is the outer multilobular skirt or the inner multilobular skirt or even both, nevertheless has an important drawback, which is particularly noticeable with regard to lobes situated at the rear of the vehicle. When the vehicle moves, these lobes which converge in a downwards direction with respect to the structure, tend to catch on obstacles when moving on the ground, since they project in the direction of the latter, or to collect part of the eddy currents formed at the rear of the vehicle, which may lead to substantial deceleration of the vehicle, or even to tearing of the skirts.

As has been described and illustrated for example in British Pat. Nos. 1 043 351 and 1 109 562, an attempt has been made to remedy this drawback by interconnecting the side walls of lobes converging in a downwards direction with respect to the structure, by means of sheets of flexible material. One thus forms a type of pocket of general frustoconical shape, the point of which is directed downwards.

More precisely, in the vicinity of this point, the said pockets are open in order to allow the discharge of air.

If necessary, it is possible to provide that the lower free edges of the lobe converging in a downwards direction with respect to the structure and of the sheet of flexible material are in close contact one against the other in order to limit the discharge of air when the lobe is in equilibrium.

Although this is so, in practice it is found that these arrangements are not completely satisfactory. Obstacles and eddy currents easily penetrate the gap between the lobe which converges in a downwards direction with respect to the structure and the sheet of flexible material, which frequently leads to tearing of the skirts.

Vehicles travelling on air cushions used hitherto thus could cross only obstacles of relatively low height. Naturally this limited the use of such vehicles very considerably.

An object of the invention is to provide a vehicle travelling on air cushions having a new construction of skirt, which whilst retaining the advantages inherent in the various types of skirts used previously, resolves the problem posed and in particular makes it possible to use the vehicle on terrain comprising obstacles of a height substantially equal to the height of the skirt.

According to the invention there is provided a vehicle travelling on air cushions comprising a lifted structure and a lift arrangement which comprises at least one multilobular skirt having a plurality of first lobes open towards the inside of the vehicle, a lower part of each first lobe converging in a downwards direction with respect to the structure, and at least in the vicinity of the rear of the vehicle, each open first lobe which converges in a downwards direction with respect to the structure comprising, on its inside, an anti-damage lobe which diverges in a downwards direction with respect to the structure at an inclination such that the values of the angles formed by the respective outermost generatrices of the two lobes with respect to the vertical, are substantially equal, the anti-damage lobe being connected, laterally and along a rectilinear connection, to the side walls of the first lobe which converge in a downwards direction with respect to the structure, and said anti-damage lobe being connected by its lower part, and in a horizontal plane, to the base of the first lobe.

The anti-damage lobe can have a concave shape towards the inside of the cushion so that when encountering an obstacle, the wall of the anti-damage lobe slides, thus causing the arrangement of the skirt to rise. This shape thus facilitates the retraction of the skirt on encountering obstacles.

The arrangement of the anti-damage lobe and outer first lobe can be opened out and can thus be cut from a single panel of fabric, which prevents any connection or discontinuity in the vicinity of the connecting line between the two lobes. On the other hand, this line is preferably horizontal in order to limit leakages of flow between two adjacent lobes.

A multilobular skirt provided with anti-damage lobes may form either the outer multilobular skirt which defines the peripheral lift arrangement externally, or the inner multilobular skirt which defines the central lift cushion, or even each of these two said skirts.

In addition, it is advantageous to provide an anti-wear band in the vicinity of the connecting line existing between a said first lobe of the multilobular skirt and the respective anti-damage lobe, in order to protect the latter.

In one embodiment, the anti-damage lobe is connected by its upper part to the lifted structure and in the upper portion comprises holes for supplying pressurized air, for the volume disposed between each first lobe of the multilobular skirt and the corresponding anti-damage lobe.

In another embodiment, the anti-damage lobe is not connected by its upper part to the lifted structure and the space thus defined between the anti-damage lobe and the lifted structure ensures the supply of pressurized air, for the volume disposed between each said first lobe of the multilobular skirt and the associated anti-damage lobe.

The anti-damage lobe may assume any suitable shape, such as a frustoconical shape, a cylindrical shape, or may even have a more complicated shape in which the upper leakage line of the respective inner (first) lobe is rectilinear, when the peripheral lift arrangement is under pressure, whilst being connected in a horizontal plane to the first lobes of cylindrical or frustoconical shape of the multilobular skirt.

Preferably, the angle formed with respect to the vertical, by the outermost generatrix of a said first lobe of the multilobular skirt is between 20° and 45°.

Advantageously, the anti-wear band located in the vicinity of the connecting line between a said first lobe of the multilobular skirt and the respective anti-damage lobe can be formed using anti-abrasion material, for example a fluorocarbonated resin.

In the case where the height of the obstacles to be crossed does not exceed 30% of the height of the skirt, the attachment under the lifted structure of first lobes of the multilobular skirt and of anti-damage lobes may be ensured solely by one member.

On the other hand, when the obstacles to be crossed may reach a height amounting to approximately 80% of the height of the skirts, it proves necessary to fix lobes of the multilobular skirt and of the anti-damage lobes below the lifted structure by means of members of reduced dimensions connected to extensible rubber springs.

BRIEF DESCRIPTION OF THE DRAWINGS

FIG. 1 shows a lobe of a multilobular skirt.

FIG. 1A is a cut away view of an air cushion vehicle having a plurality of inner lobes opening in the direction of the central air cushion.

FIG. 1B is a cut away view of an air cushion vehicle having a plurality of closed skirts surrounding the central cushion.

FIG. 2 shows diagrammatically a first embodiment of a multilobular skirt provided with anti-damage lobes of a vehicle formed according to the invention;

FIG. 3 shows diagrammatically a second embodiment of a multilobular skirt provided with anti-damage lobes of a vehicle formed according to the invention.

FIG. 3A shows an embodiment similar to FIG. 3 but including rubber springs to fix the lobes of the skirt.

As illustrated in FIG. 2, whether it is a question of an outer multilobular skirt or an inner multilobular skirt, each of the lobes L of a multilobular skirt is defined by a wall or partition 10 which converges in a downwards direction with respect to the structure. The side edges of each lobe L are connected to side panel members v themselves kept under tension, for example by straps (not shown) or any other similar member. The upper edge b of the skirts is naturally connected in a sealed manner to the platform of the lifted structure (not shown).

Naturally, in the case where the lower part of the lobe L which converges in a downwards direction with respect to the structure is surmounted by an upper part which diverges in a downwards direction with respect to the structure, it is the upper edge of the latter and not that of the lower part which is connected to the lifted structure. Generally, this case relates more particularly to outer multilobular skirts.

As is shown in FIG. 2, an anti-damage lobe 20 is also provided on the inside of the wall 10 of each lobe L of the multilobular skirt, which lobe 20 diverges in a downwards direction with respect to the structure at an inclination such that the values of the angles formed by the respective outermost generatrices 11 and 21 of the two lobes 10 and 20 with respect to the vertical, are substantially equal. Each anti-damage lobe 20 is connected, by its lower part and in a horizontal plane, to the base of the corresponding lobe 10 of the multilobular skirt, along a connecting line 14 in the form of a section of an elipse determined by the intersection of the cylindrical or conical lobe 10 of the multilobular skirt and of a horizontal secant plane, which is oblique with respect to the axis of revolution of the latter. This arrangement makes it possible to eliminate leakages between two adjacent lobes. On the other hand, the anti-damage lobe 20 is connected laterally and along a rectilinear connection, to the lobe 10 of the multilobular skirt or to the member v ensuring the connection between the lobes 10 and the straps or similar members producing tensioning of the latter. The connection between the anti-damage lobe 20 and the members v may be produced either by stitching or by a mechanical connection. As is apparent from FIG. 2, in the case where the anti-damage lobes 20 have a frustoconical or conical shape, they are connected to the said side members v along their line of tangency.

As has already been mentioned, the anti-damage lobes 20 have a concave shape towards the inside of the cushion.

According to the embodiment illustrated in FIG. 2, the anti-damage lobes 20 are not connected by their upper part, to the lifted structure. In such an embodiment, the space (shown diagrammatically by the reference 22) existing between the upper limit of the anti-damage lobe 20 and the lifted structure ensures the supply of pressurized air to the volume comprised between each lobe 10 of the multilobular skirt and the associated anti-damage lobe 20, thus ensuring a connection between this volume and the space located at the rear of the anti-damage lobe 20, a space which is in turn supplied directly with pressurized air. By way of example, the space located at the rear of the anti-damage lobe 20 may be supplied directly from the diffusion chamber (not shown) through the intermediary of suitable orifices provided with regulating means (for example by pivoting flaps) associated with the latter.

Naturally, as shown in FIG. 3, the anti-damage lobe 20 may be connected by its upper part to the lifted structure. In such a case, it is necessary that in its upper part the anti-damage lobe 20 comprises holes 23 for supplying pressurized air for the volume comprised between each lobe 10 of the multilobular skirt and the corresponding anti-damage lobe 20.

As is also apparent from FIG. 2, in order to allow the discharge of water which could possibly penetrate the volume situated between each lobe 10 of the multilobular skirt and an anti-damage lobe 20, through the space 22 comprised between the upper limit of the latter and the lifted structure (or through orifices provided at the top of the lobe 20 as exemplified by holes 23 in FIG. 3) openings 25 are provided in the lower part of the anti-damage lobe 20. In this way, the water which penetrates inside the volume defined between each lobe 10 of the multilobular skirt and an anti-damage lobe 20 slides along the walls defined in this way and is discharged through the intermediary of the openings 25.

There is also provided in the vicinity of the connecting line 14, in the form of a section of an elipse, existing between the lobe 10 of the multilobular skirt and the anti-damage lobe 20, an anti-wear band 30 intended to protect the fold and the connection existing between the two lobes. This anti-wear band is advantageously formed using anti-abrasion material.

It will thus be understood that on account of the anti-damage lobes 20, the lobes 10 of the multilobular skirts, whether the latter is an outer multilobular skirt or an inner multilobular skirt, can in no way become engaged on obstacles during the movement of the vehicle. In fact, the anti-damage lobe 20 slides over the obstacle and consequently makes it possible to raise the multilobular skirt without damage to the latter. Furthermore, it should be noted that whilst the anti-damage lobe 20 proves very useful on uneven ground, in the opposite case on flat ground, the anti-damage lobe does not transmit any tension to the lobe 10 of the multilobular skirt. Thus the anti-damage lobe 20 is not troublesome on flat ground.

Naturally, during normal operation of the vehicle travelling on air cushions, only the anti-damage lobes 20 located at the rear part of the vehicle and the anti-damage lobes 20 located at the sides in the vicinity of the latter intervene in order to allow the vehicle to cross obstacles without damage. However, to the extent that the anti-damage lobes have no detrimental effect when inoperative, it is advantageous to provide anti-damage lobes 20 of this type over the entire periphery of the vehicle, so that the anti-damage lobes 20 in question come into operation in turn depending on the movement of the vehicle (forwards travel, reverse travel, sideways movement).

The embodiment illustrated in FIG. 3 will now be described.

This figure shows two lobes L formed by walls 10 which converge in a downwards direction with respect to the structure and are connected to lateral members v ensuring their tensioning.

Here too, an anti-damage lobe 20 is provided on the inside of the lobes 10 of the multilobular skirt. The anti-damage lobes 20 diverge in a downwards direction with respect to the structure at an inclination such that the values of the angles formed by the respective outermost generatrices (11 and 21) of the lobe 10 of the multilobular skirt and of the anti-damage lobe 20, with respect to the vertical, are substantially equal. Similarly, the anti-damage lobe 20 is concave towards the inside.

However, contrary to the embodiment illustrated in FIG. 2, the anti-damage lobe 20 does not have a frustoconical or cylindrical shape, but has a complex shape. The anti-damage lobe is connected on the one hand to the lobe 10 of the multilobular skirt at its lower part along a connection 14. Said connection 14 is in the form of a section of an ellipse determined by the intersection of the cylindrical or conical lobe 10 of the multilobular skirt and of a horizontal secant plane which is oblique with respect to the axis of revolution of the latter. On the other hand, the anti-damage lobe 20 is connected laterally, along two rectilinear connections to the aforesaid lateral members v or to the lobe 10 of the multilobular skirt. Finally, the anti-damage lobe 20 is connected along a horizontal rectilinear connection to the lifted structure (not shown). In other words, an anti-damage lobe 20 of this type is formed by a substantially flat, triangular central member 26, the base of which is formed by the horizontal rectilinear connection of this anti-damage lobe 20 to the lifted structure and the apex of which is contained in the eliptical connecting line 14 of the anti-damage lobe 20 and of the lobe 10 of the multilobular skirt, on the other hand of two lateral conical casing members 27 connected to the central triangular member 26 respectively on either side of the latter and the apices of which are located on either side of the base of the central triangular member 26.

As shown in FIG. 3, since the anti-damage lobe 20 is connected by its upper part to the lifted structure, it is necessary to provide in the upper portion, holes 23 for supplying pressurized air for the volume comprised between each lobe 10 of the multilobular skirt and the anti-damage lobe 20.

Naturally, it is also possible to provide an anti-damage lobe 20 formed by the assembly of a substantially flat, central triangular part 26 and two lateral conical encasing members 27, for which the upper leakage line is rectilinear when the peripheral lift arrangement is under pressure, without the anti-damage lobe 20 being connected by its upper part to the lifted structure. In such a case, it is not necessary to provide in the upper portion of the anti-damage lobe 20, holes for supplying pressurized air (similar to the said holes 23) but the space 22 existing between the anti-damage lobe 20 and the lifted structure is sufficient to ensure the supply of pressurized air to the volume comprised between each lobe 10 of the multilobular skirt and each anti-damage lobe 20, thus ensuring a connection between this volume and the space comprised at the rear of the anti-damage lobe 20, which is in turn supplied.

Here too, it is necessary to provide openings in order to allow the discharge of water which could possibly penetrate the volume located between each lobe 10 of the multilobular skirt and an anti-damage lobe 20. Openings 25 of this type (such as shown at 25 in FIG. 2) may be formed in the lower portion of the anti-damage lobe 20. However, as illustrated in FIG. 3, it is also possible to provide openings 15 in the lower portion of the lobe 10 of the multilobular skirt.

An anti-wear band 30 is preferably located in the vicinity of the fold formed by the lobe 10 of the multilobular skirt and the anti-damage lobe 20 in order to protect said fold.

Preferably, the angle formed by the outermost generatrix 11 of the lobes 10 of the multilobular skirt is between 20° and 45°.

The applicant has found that in the case where the obstacles to be crossed do not exceed a height equal to 30% of the height of the skirt, the attachment of the lobes 10 of the multilobular skirt and of the anti-damage lobes 20, below the lifted structure, could be ensured solely by conventional lateral panel members v.

On the other hand, the applicant has found that in the case where the obstacles to be crossed could reach a height approaching 80% of the height of the skirt, it would prove necessary as shown in FIG. 3A to fix the lobes 10 of the multilobular skirt and the anti-damage lobes 20 below the lifted structure by means of lateral members v of reduced dimensions, connected to rubber extensible springs 50, i.e. rubber cables, which give the connection of the lobes 10 of the multilobular skirt and of the anti-damage lobes 20 greater flexibility, in order to allow greater deformation and lifting of the latter when crossing over obstacles.

Naturally, the lobes 10 of the multilobular skirt and the anti-damage lobes 20 may be formed by separate members connected to each other by any suitable means. However, in one advantageous embodiment, the arrangement formed by one lobe 10 of the multilobular skirt and the anti-damage lobe 20 which is associated therewith may be formed from a single panel of fabric. Thus, the lobes 10 of the multilobular skirt and the anti-damage lobes 20 are obtained by simple folding, thus eliminating any joint between the latter. In such a case, the anti-wear band 30 does not strictly speaking protect the connection between the two lobes 10 and 20, but rather the lower fold and portion of the latter.

Tests carried out with vehicles travelling on air cushions equipped with lobes formed in accordance with the present invention have shown that the anti-damage lobe 20 makes it possible on water to reduce very considerably the damage to the open outer lobes and similar open inner lobes and likewise makes it much easier to travel over solid obstacles on uneven ground.

Naturally, the invention is not limited to the embodiments which have been described with reference to FIGS. 2 and 3 since numerous variations could be provided without diverging from the scope of the claims attached hereto.

In particular, the invention could easily be applied to all types of vehicles travelling on air cushions, whatever the structure and method of supplying the latter.

Generally, the invention may also relate to vehicles having a lift arrangement comprising closed lobes of large dimensions. In such a case, the concavity of the closed skirts directed towards the inside of the vehicle is in fact similar at all points to the lobes 10 of a multilobular skirt, which are open towards the inside of the vehicle.

What is claimed is:

1. In a ground effect vehicle including a vehicle structure and a lifting arrangement supporting the structure, the improvement wherein said lifting arrangement comprises:
   (a) at least one multilobular skirt having a plurality of first lobes open toward the inside of the vehicle, each said first lobe including side walls having a lower part which converges in a downward direction with respect to the structure; and
   (b) anti-damage lobes disposed at least at the rear of the vehicle on the inside of said first lobes;
   said anti-damage lobes diverging in a downward direction with respect to the structure at an inclination such that the values of the angles formed by the respective outermost generatrices of the two lobes with respect to the vertical are substantially equal;
   said anti-damage lobes having a concave shape toward the inside of the vehicle and having a lower part and an upper part; and wherein each anti-damage lobe is connected laterally and along a rectilinear connection to the side walls of an associated first lobe and by its lower part to the base of the associated first lobe in a horizontal plane.

2. The lifting arrangement as claimed in claim 1, in which an anti-wear band covers the lower parts of said first lobes and of said anti-damage lobes.

3. The lifting arrangement as claimed in claim 2, in which the anti-wear band includes anti-abrasion material.

4. The lifting arrangement as claimed in claim 1, in which each anti-damage lobe is connected with its upper part below the vehicle structure, and wherein holes are provided in an upper portion of each anti-damage lobe for supplying pressurized air for a volume disposed between each anti-damage lobe and the associated first lobe.

5. The lifting arrangement as claimed in claim 1, wherein a space is provided between the upper part of each anti-damage lobe and a structure for supplying pressurized air for a volume disposed between each anti-damage lobe and the associated first lobe.

6. The lifting arrangement as claimed in claim 1, in which the anti-damage lobe has a frustoconical shape.

7. The lifting arrangement as claimed in claim 1, in which the anti-damage lobe has a cylindrical shape.

8. The lifting arrangement as claimed in claim 1, in which the anti-damage lobe has an upper edge which is rectilinear and horizontal.

9. The lifting arrangement as claimed in claim 1, in which the angle formed with respect to the vertical by the outermost generatrix of a said first lobe is between 20° and 45°.

10. The lifting arrangement as claimed in claim 1, intended for crossing obstacles of a height not exceeding 30% of the height of the skirt, wherein the attachment under the vehicle structure of said first lobes of the multilobular skirt and of the respective anti-damage lobes is provided by simple panel members.

11. The lifting arrangement as claimed in claim 1, intended for crossing obstacles of a height of up to 80% of the height of the skirt, wherein the attachment below the vehicle structure of said first lobes and of the respective anti-damage lobes is provided by panel members of reduced dimensions connected to extensible rubber springs.

12. The lifting arrangement as claimed in claim 1, in which openings are provided in one of the lower part of the anti-damage lobe and the lower part of an outer, first lobe, in order to allow discharge of water which might enter the volume located between said first and said anti-damage lobes.

* * * * *